US011270205B2

(12) United States Patent
Harang

(10) Patent No.: US 11,270,205 B2
(45) Date of Patent: Mar. 8, 2022

(54) METHODS AND APPARATUS FOR IDENTIFYING THE SHARED IMPORTANCE OF MULTIPLE NODES WITHIN A MACHINE LEARNING MODEL FOR MULTIPLE TASKS

(71) Applicant: Sophos Limited

(72) Inventor: Richard Harang, Alexandria, VA (US)

(73) Assignee: Sophos Limited, Abingdon (GB)

( * ) Notice: Subject to any disclaimer, the term of this patent is extended or adjusted under 35 U.S.C. 154(b) by 960 days.

(21) Appl. No.: 15/907,807

(22) Filed: Feb. 28, 2018

(65) Prior Publication Data

US 2019/0266492 A1 Aug. 29, 2019

(51) Int. Cl.
*G06N 3/08* (2006.01)
*G06N 3/04* (2006.01)

(52) U.S. Cl.
CPC .............. *G06N 3/082* (2013.01); *G06N 3/04* (2013.01)

(58) Field of Classification Search
CPC ............. G06N 3/082; G06N 3/04; G06N 3/02
See application file for complete search history.

(56) References Cited

U.S. PATENT DOCUMENTS

| 7,069,589 B2 | 6/2006 | Schmall et al. |
| 7,204,152 B2 | 4/2007 | Woodward et al. |
| 7,219,148 B2 | 5/2007 | Rounthwaite et al. |
| 7,545,986 B2 | 6/2009 | Bachmann |
| 7,558,832 B2 | 7/2009 | Rounthwaite et al. |
| 7,711,663 B2 | 5/2010 | Weng |
| 7,934,103 B2 | 4/2011 | Kidron |
| 8,458,794 B1 | 6/2013 | Sallam |

(Continued)

FOREIGN PATENT DOCUMENTS

| CA | 2799691 C | 9/2014 |
| WO | WO 2007/117636 A2 | 10/2007 |

(Continued)

OTHER PUBLICATIONS

Engelbrecht, Andries P.; A New Pruning Heuristic Based on Variance Analysis of Sensitivity Information; IEEE Transactions on Neural Networks, vol. 12, No. 6, Nov. 2001; pp. 1386-1399. (Year: 2001).*

(Continued)

*Primary Examiner* — Stanley K. Hill
(74) *Attorney, Agent, or Firm* — Cooley LLP

(57) ABSTRACT

In some embodiments, a method includes providing an indication of a first file having a first characteristic to a neural network and receiving a classification associated with the first file from the neural network. The method includes providing an indication of a second file having a second characteristic to the neural network and receiving a classification associated with the second file from the neural network. The method further includes calculating a shared importance value for each node from a set of nodes in the neural network. The shared importance value indicates an amount to which that node is used to produce both the classification associated with the first file and the classification associated with the second file. The method further includes modifying the neural network based on the shared importance for at least one node from the set of nodes.

27 Claims, 8 Drawing Sheets

(56) References Cited

U.S. PATENT DOCUMENTS

| | | | |
|---|---|---|---|
| 9,189,730 | B1 | 11/2015 | Coenen et al. |
| 9,404,833 | B2 | 8/2016 | Stadlbauer et al. |
| 9,514,391 | B2 | 12/2016 | Perronnin et al. |
| 9,672,358 | B1 | 6/2017 | Long et al. |
| 9,690,938 | B1 | 6/2017 | Saxe et al. |
| 9,721,097 | B1 | 8/2017 | Davis et al. |
| 9,792,492 | B2 | 10/2017 | Soldevila et al. |
| 9,807,113 | B2 | 10/2017 | Yang et al. |
| 9,864,956 | B1 | 1/2018 | Sai |
| 10,193,902 | B1 | 1/2019 | Caspi |
| 10,635,813 | B2 | 4/2020 | Saxe et al. |
| 2009/0300765 | A1 | 12/2009 | Moskovitch et al. |
| 2014/0090061 | A1 | 3/2014 | Avasarala et al. |
| 2014/0143869 | A1 | 5/2014 | Pereira et al. |
| 2015/0067853 | A1 | 3/2015 | Amrutkar et al. |
| 2015/0363294 | A1 | 12/2015 | Carback, III et al. |
| 2017/0078317 | A1 | 3/2017 | Gertner et al. |
| 2017/0212829 | A1 | 7/2017 | Bales et al. |
| 2017/0372071 | A1 | 12/2017 | Saxe et al. |
| 2018/0211041 | A1 | 7/2018 | Davis |
| 2018/0293381 | A1 | 10/2018 | Tseng et al. |
| 2019/0108338 | A1 | 4/2019 | Saxe et al. |
| 2019/0236273 | A1 | 8/2019 | Saxe et al. |
| 2019/0236490 | A1 | 8/2019 | Harang et al. |
| 2020/0117975 | A1 | 4/2020 | Harang et al. |

FOREIGN PATENT DOCUMENTS

| | | |
|---|---|---|
| WO | WO 2019/150079 A1 | 8/2019 |
| WO | WO 2019/166989 A1 | 9/2019 |

OTHER PUBLICATIONS

Augasta, M. Gethsiyal et al.; Pruning algorithms of neural networks—a comparative study; Cent. Eur. J. Comp. Sci. • 3(3) • 2013 • 105-115. (Year: 2013).*

Shah, Shivani et al.; Virus Detection using Artificial Neural Networks; International Journal of Computer Applications (0975-8887) vol. 84—No. 5, Dec. 2013; pp. 17-23. (Year: 2013).*

Tu, Ming et al.; Reducing the Model Order of Deep Neural Networks Using Information Theory; 2016 IEEE Computer Society Annual Symposium on VLSI; pp. 93-98. (Year: 2016).*

Kim, Hae-Jung; Image-Based Malware Classification Using Convolutional Neural Network; Advances in Computer Science and Ubiquitous Computing, Lecture Notes in Electrical Engineering; pp. 1352-1357. (Year: 2017).*

Pennington, Jeffrey et al.; The Spectrum of the Fisher Information Matrix of a Single-Hidden-Layer Neural Network; pp. 1-16. (Year: 2018).*

Ribeiro, M. T., "LIME—Local Interpretable Model-Agnostic Explanations," [Online Blog], Retrieved from the Internet: <URL: https://homes.cs.washington.edu/~marcotcr/blog/lime/>, Apr. 2, 2016, 7 pages.

Ribeiro, M. T. et al., "'Why Should I Trust You?' Explaining the Predictions of Any Classifier," [Online], Retrieved from the Internet: <URL: https://arxiv.org/pdf/1602.04938v3.pdf>, Aug. 9, 2016, 10 pages.

Tolomei, G. et al., "Interpretable Predictions of Tree-based Ensembles via Actionable Feature Tweaking," [Online], Retrieved from the Internet: <URL: https://arxiv.org/pdf/1706.06691.pdf>, Jun. 20, 2017, 10 pages.

Ribeiro, M. T. et al., "Model-Agnostic Interpretability of Machine Learning," [Online], Retrieved from the Internet: <URL: https://arxiv.org/pdf/1606.05386.pdf>, Jun. 16, 2016, 5 pages.

Montavon, G. et al., "Methods for Interpreting and Understanding Deep Neural Networks," [Online], Retrieved from the Internet: <URL: https://arxiv.org/pdf/1706.07979.pdf>, Jun. 24, 2017, 14 pages.

Lundberg, S. M. et al., "A Unified Approach to Interpreting Model Predictions," 31st Conference on Neural information Processing Systems (NIPS 2017), Long Beach, CA, USA, 10 pages.

Theis, L. et al., "Faster gaze prediction with dense networks and Fisher pruning," [Online], Retrieved from the Internet: <URL: https://arxiv.org/pdf/1801.05787.pdf>, Jan. 17, 2018, 10 pages.

Harang, R., "Estimating weight sharing in multi-task networks via approximate Fisher information," Oct. 28, 2017, 31 pages.

Tu, M. et al., "Ranking the parameters of deep neural networks using the Fisher information," 41st IEEE International Conference on Acoustics, Speech and Signal Processing, ICASSP 2016—Shanghai, China, Institute of Electrical and Electronics Engineers Inc., pp. 2647-2651 (2016).

Kirkpatrick, J. et al., "Overcoming catastrophic forgetting in neural networks," PNAS, vol. 114, No. 13, pp. 3521-3526 (Mar. 2017).

Pascanu, R. et al., "Revisiting natural gradient for deep networks," [Online], Retrieved from the Internet: <URL: https:/arxiv.org/pdf/1301.3584v7.pdf>, Feb. 17, 2014, 18 pages.

Salimans, T. et al., "Weight Normalization: A Simple Reparameterization to Accelerate Training of Deep Neural Networks," [Online], Retrieved from the Internet: <URL https://arxiv.org/pdf/1602.07868.pdf>, Jun. 4, 2016, 11 pages.

Huang, L. et al., "Orthogonal Weight Normalization: Solution to Optimization over Multiple Dependent Stiefel Manifolds in Deep Neural Networks," [Online], Retrieved from the Internet: <URL: https://arxiv.org/pdf/1709.06079.pdf>, Nov. 21, 2017, 20 pages.

International Search Report and Written Opinion for International Patent Application No. PCT/US2018/054558, dated Dec. 10, 2018, 6 pages.

Rudd, E.R., et al., "MOON: A Mixed Objective Optimization Network for the Recognition of Facial Attributes." [Online], Retrieved from the Internet: <URL:https://arxiv.org/abs/1603.07027>, arXiv:1603.07027 [cs.CV], Mar. 22, 2016, 17 pages.

Saxe and Berlin, "Deep Neural Network Based Malware Detection Using Two Dimensional Binary Program Features," IEEE 2015,10th International Conference on Malicious and Unwanted Software: "Know Your Enemy" (MALWARE), 2015, pp. 11-20.

Saxe and Berlin, "eXpose: A Character-Level Convolutional Neural Network with Embeddings for Detecting Malicious URLs, File Paths and Registry Keys." [Online], Retrieved from the Internet: <https://arxiv.org/abs/1702.08568>, arXiv:1702.08568v1 [cs.CR], Feb. 27, 2017, 18 pages.

Tahan, G., et al., "Mal:ID: Automatic Malware Detection Using Common Segment Analysis and Meta-Features." Journal of Machine Learning (2012); (Submitted Aug. 2011; Published Feb. 2012); 1:1-48, 33 pages.

Ba, et al., "Layer Normalization." [Online] Retrieved from the Internet https://arxiv.org/pdf/1607.06450.pdf>, Submitted on Jul. 21, 2016, 14 pages.

Harang, R. "Estimating weight sharing in multi-task networks via approximate Fisher information," SOPHOS, [Online] Retrieved from the Internet https://www.camlis.org/s/harang_CAMLIS17.pdf> Oct. 28, 2017, 31 pages.

Ioffe and Szegedy, "Batch Normalization: Accelerating Deep Network Training by Reducing Internal Covariate Shift." [Online] Retrieved from the Internet https://arxiv.org/pdf/1502.03167v3.pdf>, Submitted on Feb. 11, 2015 (v1), last revised Mar. 2, 2015 (this version, v3), 11 pages.

Liao and Carneiro, "On the Importance of Normalisation Layers in Deep Learning with Piecewise Linear Activation Units." [Online] Retrieved from the Internet https://arxiv.org/pdf/1508.00330.pdf>, Submitted on Aug. 3, 2015 (v1), last revised Nov. 1, 2015 (this version, v2)), 7 pages.

Liao, et al., "Streaming Normalization: Towards Simpler and More Biologically-plausible Normalizations for Online and Recurrent Learning." Center for Brains, Minds & Machines, Memo No. 057, [Online] Retrieved from the Internet https://arxiv.org/pdf/1610.06160.pdf>, Oct. 19, 2016, 21 pages.

Santos and Torres, "Macro Malware Detection using Machine Learning Techniques—A New Approach." In Proceedings of the 3rd International Conference on Information Systems Security and Privacy (ICISSP 2017, SCITEPRESS—Science and Technology Publications, Lda), pp. 295-302, ISBN: 978-989-758-209-7, ElevenPaths, Telefónica Digital Cyber Security Unit, Madrid, Spain. [Online], Retrieved from the Internet on Nov. 19, 2018: http://www.scitepress.org/Papers/2017/61322, 8 pages.

(56) References Cited

OTHER PUBLICATIONS

Srivastava, et al., "Dropout: A Simple Way to Prevent Neural Networks from Overfitting." Journal of Machine Learning Research (2014); 15: 1929-1958. Submitted Nov. 2013; Published Jun. 2014, 30 pages.

Wu, et al., "L1-Norm Batch Normalization for Efficient Training of Deep Neural Networks." [Online] Retrieved from the Internet https://arxiv.org/pdf/1802.09769.pdf>, Submitted on Feb. 27, 2018, 8 pages.

Deo, A., et al., "Prescience: Probabilistic Guidance on the Retraining Conundrum for Malware Detection", AISec '16 Proceedings of the 2016 ACM Workshop on Artificial Intelligence and Security, Oct. 28, 2016, Vienna, Austria, Retrieved from the Internet http://delivery.acm.org/10.1145/3000000/2996769/p71-deo.pdf?ip=69.125.105.131&id=2996769&acc=OPENTOC&key=4D4702B0C3E38B35%2E4D4702B0C3E38B35%2E4D4702B0C3E38B35%2E9F04A3A78F7D3B8D&_acm_=1573741004_98b035a9ad71ffc3e5289851a65d39e7, 12 pages.

Harang and Ducau, "Measuring the speed of the Red Queen's Race", BlackHat USA 2018, Aug. 4-9, 2018, Las Vegas, NV, USA, 18 pages.

Harang and Ducau, "Measuring the speed of the Red Queen's Race", SOPHOS Presentation (2018), Retrieved from the Internet https://i.blackhat.com/us-18/Wed-August-8/us-18-Harang-Measuring-the-Speed-of-the-Red-Queens-Race.pdf, 48 pages.

Harang and Rudd, "Principled Uncertainty Estimation for Deep Neural Networks". [Online] arXiv:1810.12278 [cs.LG], [v1] Oct. 29, 2018, Retrieved from the Internet https://arxiv.org/abs/1810.12278v1.pdf, 8 pages.

International Preliminary Report on Patentability for International Patent Application No. PCT/US2018/054558, dated Apr. 8, 2020, 5 pages.

International Search Report and Written Opinion for International Patent Application No. PCT/GB2019/050199, dated Mar. 29, 2019, 15 pages.

International Search Report and Written Opinion for International Patent Application No. PCT/IB2019/050642, dated Apr. 12, 2019, 12 pages.

International Search Report and Written Opinion for International Patent Application No. PCT/IB2019/051629, dated Jun. 17, 2019, 14 pages.

International Search Report and Written Opinion for International Patent Application No. PCT/GB2019/052222, dated Nov. 12, 2019, 17 pages.

International Search Report and Written Opinion for International Patent Application No. PCT/GB2020/050188, dated Mar. 31, 2020, 12 pages.

Kardan and Stanley, "Fitted Learning: Models with Awareness of their Limits". [Online] arXiv:1609.02226v4 [cs.AI] Jul. 9, 2018, Retrieved from the Internet https://arxiv.org/pdf/1609.02226.pdf, 19 pages.

Narayanan, et al., "A multi-view context-aware approach to Android malware detection and malicious code localization." Empir Software Eng (2018); 23:1222-1274. Epub Aug. 30, 2017.

Rudd, et al., "MEADE: Towards a Malicious Email Attachment Detection Engine", 2018 IEEE International Symposium on Technologies for Homeland Security (HST), IEEE, Oct. 23, 2018, pp. 1-7.

Rudd, et al., "The Extreme Value Machine". [Online] arXiv:1506.06112v4 [cs.LG] May 21, 2017, Retrieved from the Internet https://arxiv.org/abs/1506.06112.pdf, 12 pages.

Sanghani, et al., "Personalized spam filtering using incremental training of support vector machine". 2016 International Conference on Computing, Analytics and Security Trends (CAST), IEEE Dec. 19, 2016, pp. 323-328, 6 pages.

Schultz, et al., "Data Mining Methods for Detection of New Malicious Executables", Proceedings of the 2001 IEEE Symposium on Security and Privacy (2001); Oakland, CA, May 14-16, 2001; [Proceedings of the IEEE Symposium on Security and Privacy], Los Alamitos, CA: IEEE Comp. Soc., US, May 14, 2001, pp. 38-49, 12 pages.

Sethi and Kantardzic, "Handling adversarial concept drift in streaming data". Expert Systems With Applications (May 1, 2018); 97: 18-40. Available online Dec. 11, 2017.

Tian, et al., "An automated classification system based on the strings of trojan and virus families." Malicious and Unwanted Software (MALWARE); 2009 4th International Conference, Piscataway, NJ, USA, Oct. 13, 2009, pp. 23-30, 8 pages.

Velez and Clune, Identifying Core Functional Networks and Functional Modules within Artificial Neural Networks via Subsets Regression, GECCO '16, Proceedings of the Genetic and Evolutionary Computation Conference 2016, Jul. 20-24, 2016, pp. 181-188.

Notice of Allowance in U.S. Appl. No. 15/727,035, dated Dec. 27, 2019, 7 pages.

* cited by examiner

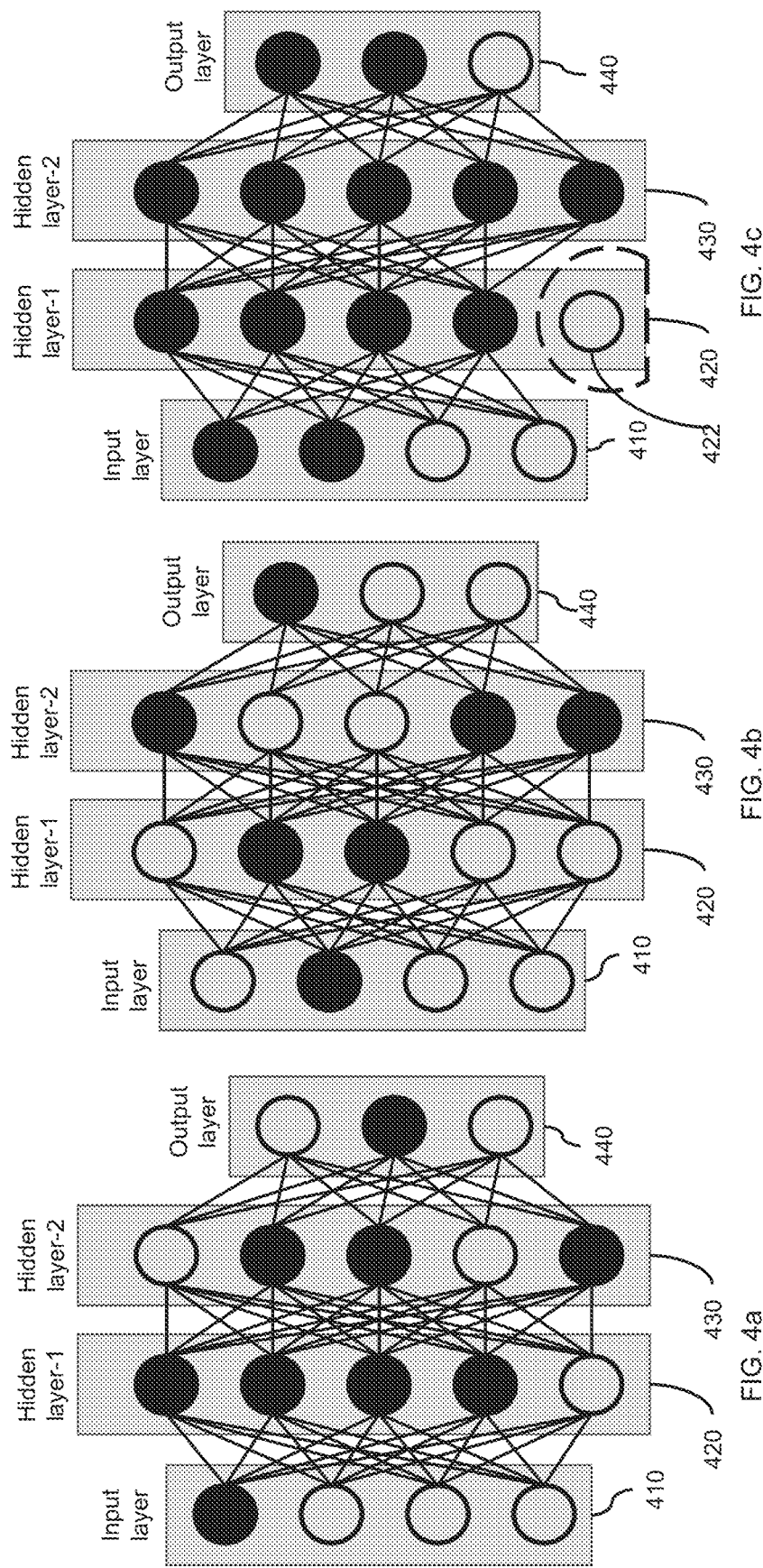

METHODS AND APPARATUS FOR IDENTIFYING THE SHARED IMPORTANCE OF MULTIPLE NODES WITHIN A MACHINE LEARNING MODEL FOR MULTIPLE TASKS

BACKGROUND

The embodiments described herein relate to methods and apparatus for determining weight sharing in a machine learning model. More particularly, the embodiments described herein relate to methods and apparatus for identifying the shared importance of multiple nodes within a machine learning model for multiple tasks.

Some known machine learning models, including neural networks, can have multiple different layers, where each layer includes multiple nodes. Nodes belonging to different layers have interconnections with other nodes to define a network. This network of multiple nodes can be used to classify files, documents, images and/or the like. Furthermore, a process for classifying a file (or performing a task), using a neural network, can be complex and may require sufficient training. Thus, performing multiple tasks with a single neural network can require a neural network that is even more complex and can require even more training. Moreover, it can be difficult to optimize a neural network without understanding the importance of each node to each task performed by the neural network.

Thus, a need exists for improved devices and methods for identifying importance of nodes within a machine learning model, and particularly when the model performs multiple tasks.

SUMMARY

In some embodiments, a method includes providing an indication of a first file having a first characteristic to a neural network and receiving a classification associated with the first file from the neural network. The method includes providing an indication of a second file having a second characteristic to the neural network and receiving a classification associated with the second file from the neural network. The method further includes calculating a shared importance value for each node from a set of nodes in the neural network. The shared importance value indicates an amount to which that node is used to produce both the classification associated with the first file and the classification associated with the second file. The method further includes modifying the neural network based on the shared importance for at least one node from the set of nodes.

BRIEF DESCRIPTION OF THE DRAWINGS

FIGS. 4a, 4b and 4c are schematic illustrations of a neural network, according to an embodiment.

DETAILED DESCRIPTION

Figure 1:
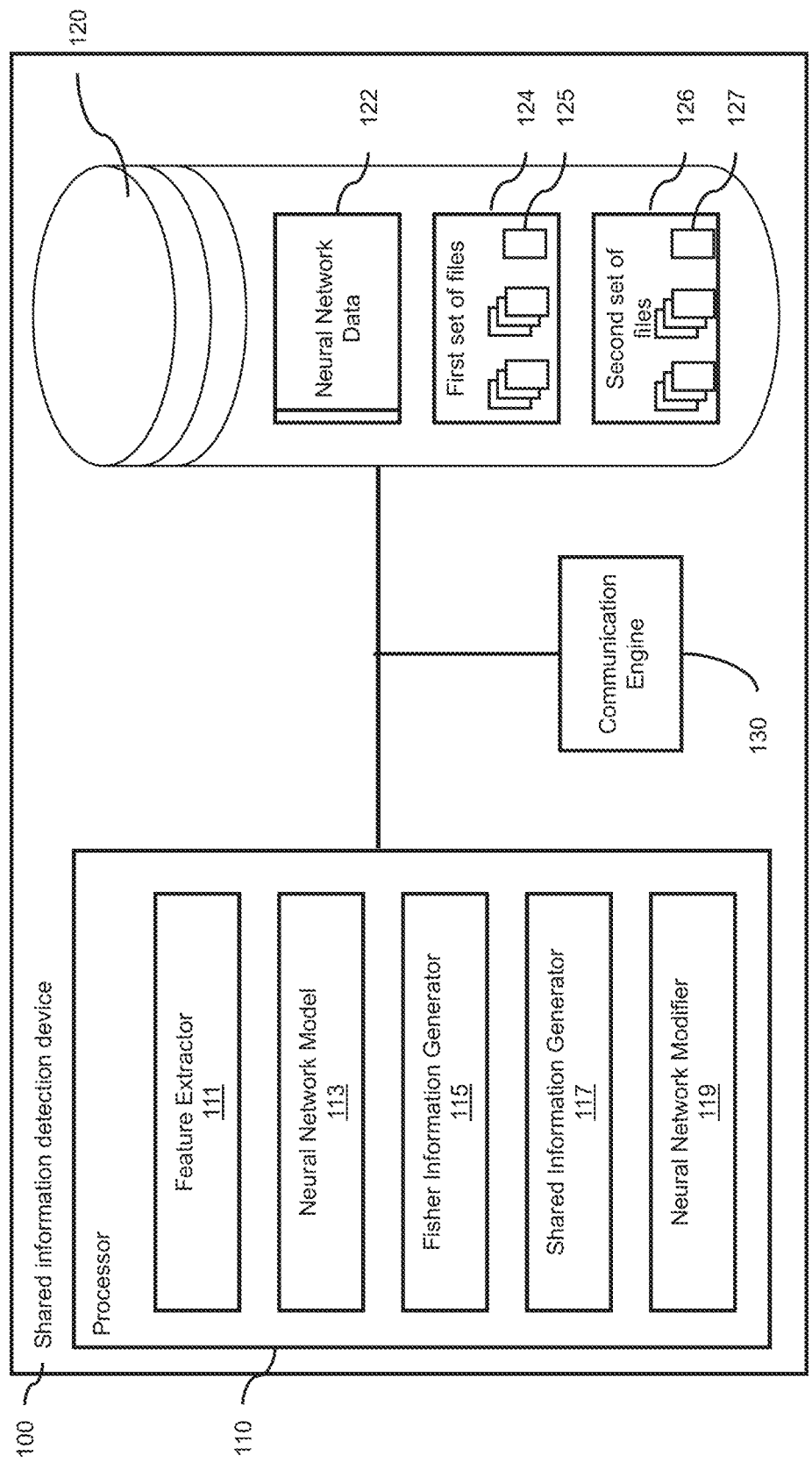
FIG. 1 is a schematic block diagram of a shared information detection device for evaluating shared importance of multiple nodes in a neural network, according to an embodiment.

In some embodiments, an apparatus includes a memory and a processor operatively coupled to the memory. The processor can be configured to provide an indication of each file from a first set of files to a neural network. Each file from the first set of files has a first characteristic. The processor can be configured to receive, from the neural network, an indication of a classification associated with each file from the first set of files. The processor can be configured to provide an indication of each file from a second set of files to the neural network. Each file from the second set of files has a second characteristic. The processor can be configured to receive, from the neural network, an indication of a classification associated with each file from the second set of files. The processor can be configured to calculate Fisher information associated with the first characteristic for each node from a set of nodes in the neural network. The processor can be configured to calculate Fisher information associated with the second characteristic for each node from the set of nodes in the neural network. The processor can be configured to identify a shared importance of each node from the set of nodes to the classification associated with the first set of files and the classification associated with the second set of files based on the Fisher information associated with the first characteristic and the Fisher information associated with the second characteristic. Furthermore, the processor can be configured to modify the neural network based on the shared importance for at least one node from the set of nodes.

In some embodiments, a non-transitory processor-readable medium stores code representing instructions to be executed by a processor. The code includes code to cause the processor to receive, from a machine learning model, an indication of a classification associated with each file from a first set of files having a first characteristic. The code further includes code to receive, from the machine learning model, an indication of a classification associated with each file from a second set of files having a second characteristic different from the first characteristic. The code further includes code to calculate an importance value associated with the first characteristic for each node from a set of nodes in the machine learning model. The code further includes code to calculate an importance value associated with the second characteristic for each node from the set of nodes in the machine learning model. The code further includes code to identify a shared importance of each node from the set of nodes to the classification associated with the first set of files and the classification associated with the second set of files based on the importance value associated with the first characteristic and the importance value associated with the second characteristic. The code further includes code to modify the machine learning model based on the shared importance for at least one node from the set of nodes.

In other embodiments, a method includes providing an indication of a first file to a neural network. The first file has a first characteristic. The method includes receiving a classification associated with the first file from the neural network. The method includes providing an indication of a second file to the neural network. The second file has a second characteristic different from the first characteristic. The method includes receiving a classification associated with the second file from the neural network. The method further includes calculating a shared importance value for each node from a set of nodes in the neural network. The shared importance value for each node from the set of nodes indicating an amount to which that node is used to produce both the classification associated with the first file and the classification associated with the second file. The method further includes removing a subset of nodes from the set of nodes based on the shared importance value for each node from the subset of nodes meeting a criterion.

FIG. 1 is a schematic block diagram of a shared information detection device 100 for evaluating weight sharing in neural networks, according to an embodiment. The shared information detection device 100 can be a hardware-based computing device and/or a multimedia device, such as, for example, a compute device, a server, a desktop compute device, a smartphone, a tablet, a wearable device, a laptop and/or the like. The shared information detection device 100 includes a processor 110, a memory 120 and a communication engine 130.

The processor 110 can be, for example, a hardware based integrated circuit (IC) or any other suitable processing device configured to run and/or execute a set of instructions or code. For example, the processor 110 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 110 is operatively coupled to the memory 120 through a system bus (for example, address bus, data bus and/or control bus).

The processor 110 can include a feature extractor 111, a neural network model 113, a Fisher information generator 115, a shared information generator 117 and a neural network modifier 119. Each of the feature extractor 111, the neural network model 113, the Fisher information generator 115, the shared information generator 117 and/or the neural network modifier 119 can be software stored in memory 120 and executed by processor 110 (e.g., code to cause the processor 110 to execute the feature extractor 111, the neural network model 113, the Fisher information generator 115, the shared information generator 117 and/or the neural network modifier 119 can be stored in the memory 120) and/or a hardware-based device such as, for example, an ASIC, an FPGA, a CPLD, a PLA, a PLC and/or the like.

The feature extractor 111 can be configured to receive a file from a set of files as an input and output a feature vector associated with the file. The feature extractor 111 extracts features from the file and forms a feature vector including indications of these features. More specifically, in some implementations, the feature extractor 111 identifies features in the file (for example, headers, variable definitions, routines, sub-routines, strings, elements, subtrees, tags and/or the like). A representation of these features can be used to define a feature vector. For example, the feature extractor 111 can normalize each feature and/or input each feature to a hash function to produce a hash value. The feature extractor 111, using the hash values, can form a feature vector (e.g., of pre-determined length and/or of variable length).

For example, in some implementations, the feature extractor 111 can be configured to extract and/or identify features of a word processing file (e.g., a '.doc' file). The features can, for example, include internal representations of the document (e.g., text streams, embedded Visual Basic Application (VBA) code, and/or metadata associated with word processing file). The feature extractor 111 can then, for example, tokenize the extracted features into printable strings by not including XML delimiting characters ('<' or '>'), removing any length less than a specified length (e.g., 5 characters) and/or other tokenizing techniques. The feature extractor 111 can then provide each feature as an input to a hash function to generate a hash value for that feature. The feature extractor 112 can use the hash values to form a feature vector representative of and/or indicative of the features in the word processing file. In some instances, the hashing can be performed to reduce the feature space into a set of blocks having a pre-determined size (for example, a block size of 512, a block size of 1024, a block size of 2048 and/or the like).

The neural network model 113 can be configured to receive a feature vector of a file and output an indication associated with classification of the file. For example, the neural network model 113 can provide an output indicating a malicious content classification of a file. The malicious content classification can include information regarding whether a file is classified as a threat. The malicious content classification can classify a file into different categories such as, for example, benign, potentially malicious, malicious content, type of malicious content, class of malicious content, malware family and/or the like. As another example, the shared information detection device 100 can be used to classify graphical content, for example, images, videos, graphs and/or the like. For example, the neural network model 113 can classify images specific to and/or including animals (e.g., a dog, a cat and/or other types of animals), birds (e.g., a sparrow, a crow and/or other types of birds), vehicles, humans and/or the like.

In some instances, the neural network model 113 can have task specific branches to accomplish multiple tasks. The task specific branches can indicate a specific path of connected nodes in different layers (for example, input layer, hidden layer(s) and/or output layer) of the neural network model 113. For example, the neural network model 113 can perform multiple tasks such as, for example, performing content classification, performing behavior classification, categorizing different file types, classifying different image types and/or the like. Content classification and behavior classification may be used, for example, to identify the likelihood that a file or a behavior is associated with a security threat (e.g., malware). Further, the neural network model 113 can have task specific branches that converge to optimize a single objective. For example, the neural network model 113 performing malware classification on '.doc' and '.docx' files can have many branches common and can be converged, as described in further detail herein (with respect to FIGS. 4a, 4b and 4c).

The Fisher information generator 115 can be configured to calculate a Fisher information matrix specific to a specific node of the neural network model 113. The calculated Fisher information matrix is used to measure an amount of information that an observable random variable X carries about an unknown parameter θ of a distribution that models X. The Fisher information generator 115 can calculate the Fisher information matrix using the formula, $$I(\theta) = E\left[\left(\frac{\delta}{\delta\theta}\log f(X;\theta)\right)^2 \bigg| \theta = \hat{\theta}\right]$$

Further, the Fisher information generator 115, using the Fisher information matrix, can calculate Fisher information associated with a characteristic of a file. Fisher information can represent the weight and/or node related information used during the classification of a file by the neural network model 113. The Fisher information generator 115 is configured to calculate Fisher information for multiple files belonging to a set of files having a similar characteristic (e.g., same type of file, similar file content, etc.). The Fisher information generator 115 can be configured to store the calculated Fisher information in the memory 120. In some instances, the Fisher information generator 115 is configured to approximate the Fisher information matrix by retaining the diagonal elements of the calculated Fisher information.

Based on the Fisher information, the shared information generator 117 can be configured to identify a shared importance of each node in the neural network model 113. The shared importance can be a value indicating the importance of a single node during the classification of two or more sets of files by the neural network model 113. The value indicating the shared importance of a node can be used to determine the significance to multiple sets of files and/or tasks of that node in the neural network model 113. The value indicating the shared importance can be numeric, alphanumeric, character-based and/or the like. The value indicating the shared importance can be relative to other nodes, absolute and/or any other suitable representation. The shared information generator 117 can, for example, identify a shared importance based on Receiver Operator Characteristic (ROC) curves of the Fisher information associated with two or more sets of files, described in further detail with respect to FIGS. 5a, 5b, 5c and 5d. Furthermore, Fisher information can be used to estimate a degree of weight sharing at a node for characteristics associated with two or more sets of files.

For example, the shared importance can be identified based on the classification associated with the first set of files and second set of files, where both sets of files (first and second) have different characteristics but are classified using the same neural network. The shared information generator 117 identifies the shared importance of a node by analyzing the Fisher information (calculated by the Fisher information generator 115) for both the first set of files and the second set of files.

The neural network modifier 119 can be configured to modify the neural network model 113 by adding and/or removing one or more nodes from the neural network model 113, defining a new neural network model based on an identified shared importance, splitting the neural network model into multiple neural network models and/or the like. In some instances, the modification to the neural network model 113 can be temporary and/or permanent and/or implemented for classifying two or more sets of files. After the shared information generator 117 identifies the importance for nodes in the neural network model 113, in some implementations the neural network modifier 119 can be configured to identify nodes that can be removed and/or added to the neural network model 113. The identification of the nodes to be removed and/or added can be determined by comparing a value indicating the significance of that node in the classification of the sets of files. Similarly stated, the neural network modifier 119 uses the output of the shared information generator 117 to optimize the neural network model 113. In other implementations, the neural network modifier 119 can be configured to define a new neural network model with instances of nodes from the neural network model 113 based on the output of the shared information generator 117. Such a new neural network model can be used to classify files in the same or a different manner as the neural network model 113. Moreover, in still other implementations, the neural network modifier 119 can be configured to split the neural network model into multiple different neural networks. For example, if the shared importance of the nodes in the neural network is low, the neural network can be split into two task specific neural networks.

The memory 120 of the shared information detection device 100 can be, for example, a random access memory (RAM), a memory buffer, a hard drive, a read-only memory (ROM), an erasable programmable read-only memory (EPROM), and/or the like. The memory 120 can store, for example, one or more software modules and/or code that can include instructions to cause the processor 110 to perform one or more processes, functions, and/or the like (e.g., the feature extractor 111, the neural network model 113, the Fisher information generator 115, shared information generator 117 and/or the neural network modifier 119). In some implementations, the memory 120 can be a portable memory (for example, a flash drive, a portable hard disk, and/or the like) that can be operatively coupled to the processor 110. In other instances, the memory can be remotely operatively coupled with the shared information detection device. For example, a remote database server can be operatively coupled to the shared information detection device.

The memory 120 can store neural network data 122 and a first set of files 124, a first file 125 belonging to the first set of files 124, a second set of files 126, and a second file 127 belonging to the second set of files 127. The neural network data 122 can include data generated by the neural network model 113 during classification of a file (for example, temporary variables, return addresses, and/or the like). The neural network data 122 can also include data used by the neural network model 113 to process and/or analyze a file (for examples, weights associated with the nodes of a neural network model, decision points associated with the machine learning model, and/or other information related to the machine learning model).

In some instances, the neural network data 122 can also include data used to train the neural network model 113. In some instances, the training data can include multiple sets of data. Each set of data can contain at least one pair of an input file and an associated desired output value or label. For example, the training data can include input files pre-categorized into categories such as, for example, malicious files and benign files. The training data can be used to train the neural network model 113 to perform classification of files.

In some instances, the neural network model 113 can be trained to learn multiple tasks substantially concurrently. The neural network model 113 can be trained using training data. The training data can include samples of one or more tasks. During the training, the weights relevant to multiple tasks can be reinforced substantially simultaneously. For example, the neural network model 113 can be trained to perform malicious content classification on '.doc' files and '.docx' files. The neural network model 113 can be trained using training data that includes benign and malicious files for both '.doc' and '.docx'. The neural network model 113 can be trained by the files occurring in random (or mixed) order. The random occurrence of documents during training can help in reinforcing the weights of both tasks substantially concurrently (e.g., both '.doc' and '.docx' classification).

In other instances, the neural network model 113 can be trained to learn individual tasks sequentially. Specifically, the neural network model 113 can be trained to learn a first task and then the neural network model 113 can be later trained to learn a second task once it has learned the first task. Thus, the neural network model 113 can learn multiple tasks sequentially. While learning a new task, the neural network model 113 can protect some of the weight values associated with earlier tasks from changing by the new task training. The neural network model 113 can protect the weight values associated with the first task to avoid overwriting learned weights associated with the first task when training on the second task.

For example, the neural network model 113 can learn to perform malicious content classification on '.doc' files. The training for performing malicious content classification on '.doc' files can involve training data including benign and malicious '.doc' files. The neural network model 113 can be trained using the training data. After training, the neural network model 113 can be tested using test data involving both benign and malicious '.doc' files that were not part of the training data. The neural network model 113 can then learn and/or be configured to perform malicious content classification on '.docx' files. The neural network model 113 can be trained using other training data including benign and malicious '.docx' files. During training for the '.docx' files, the neural network model 113 can protect the weight values important to the earlier training (e.g., '.doc' files). The neural network model 113 can be tested using test data including both benign and malicious '.docx' files. Thus, after two trainings the neural network model 113 can perform multiple tasks The communication engine 130 can be a hardware device operatively coupled to the processor 110 and memory 120 and/or software stored in the memory 120 executed by the processor 110. The communication engine 130 can be, for example, a network interface card (NIC), a Wi-Fi™ module, a Bluetooth® module and/or any other suitable wired and/or wireless communication device. Furthermore the communication engine can include a switch, a router, a hub and/or any other network device. The communication engine 130 can be configured to connect the shared information detection device 100 to a communication network (not shown in FIG. 1). In some instances, the communication engine 130 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communication engine 130 can facilitate receiving and/or transmitting a file and/or a set of files through a communication network. In some instances, a received file can be processed by the processor 110 and/or stored in the memory 120 as described in further detail herein.

In use, the processor 110, included in the shared information detection device 100, can be configured to retrieve a first file (such as, for example, first file 125) belonging to a first set of files (such as, for example, first set of files 124) having a first characteristic and from the memory 120. The feature extractor 111, included in and/or executed by the processor 110, can be configured to receive the first file and extract a set of features from the first file to define a feature vector. This feature vector can be stored in the memory 120. The processor 110 can then be configured to provide the stored feature vector from the memory 120 to the neural network model 133. The neural network model 113 can be configured to analyze the feature vector to determine a classification associated with the first file. The processor 110 can be configured to store the determined classification in the memory 120.

The processor 110 can then retrieve a second file (such as, for example, second file 127) belonging to a second set of files (such as, for example, second set of files 126) having a second characteristic and from the memory 120 and perform the same process (as for file 124 belonging to earlier set of files) as described above.

The Fisher information generator 115, included in the processor 110, can be configured to calculate Fisher information for both the first file and the second file. The Fisher information is calculated for each node in the neural network model 113 for both the first file and the second file. The Fisher information for the first file is specific to the first characteristic (e.g., of the first file) and the Fisher information for the second file is specific to the second characteristic (e.g., of the second file). Based on the Fisher information and/or the output of the neural network model (for example, classifications of the first file and second file), the shared information generator 117 can be configured to identify a shared importance of each node in the neural network model 113 to classification of files having different characteristics (e.g., to both the first file and the second file). The neural network modifier 119, included in the processor 110, can be configured to modify the neural network model 113 based on the shared importance. The neural network modifier 119 can, for example, modify the neural network model by adding and/or removing a node from the neural network model 133. In other instances, the neural network modifier 119 can define a new neural network based on the shared importance.

As described herein, it is understood that a shared information detection device (similar to shared information detection device 100 shown and described with respect to FIG. 1) can be trained to classify more than two sets of files. The shared information detection device can implement the methods described herein to identify a shared importance to classifying three sets of files having three different characteristics, four sets of files having four different characteristics, five sets of files having five different characteristics and/or any other suitable number of sets of files.

Figure 2:
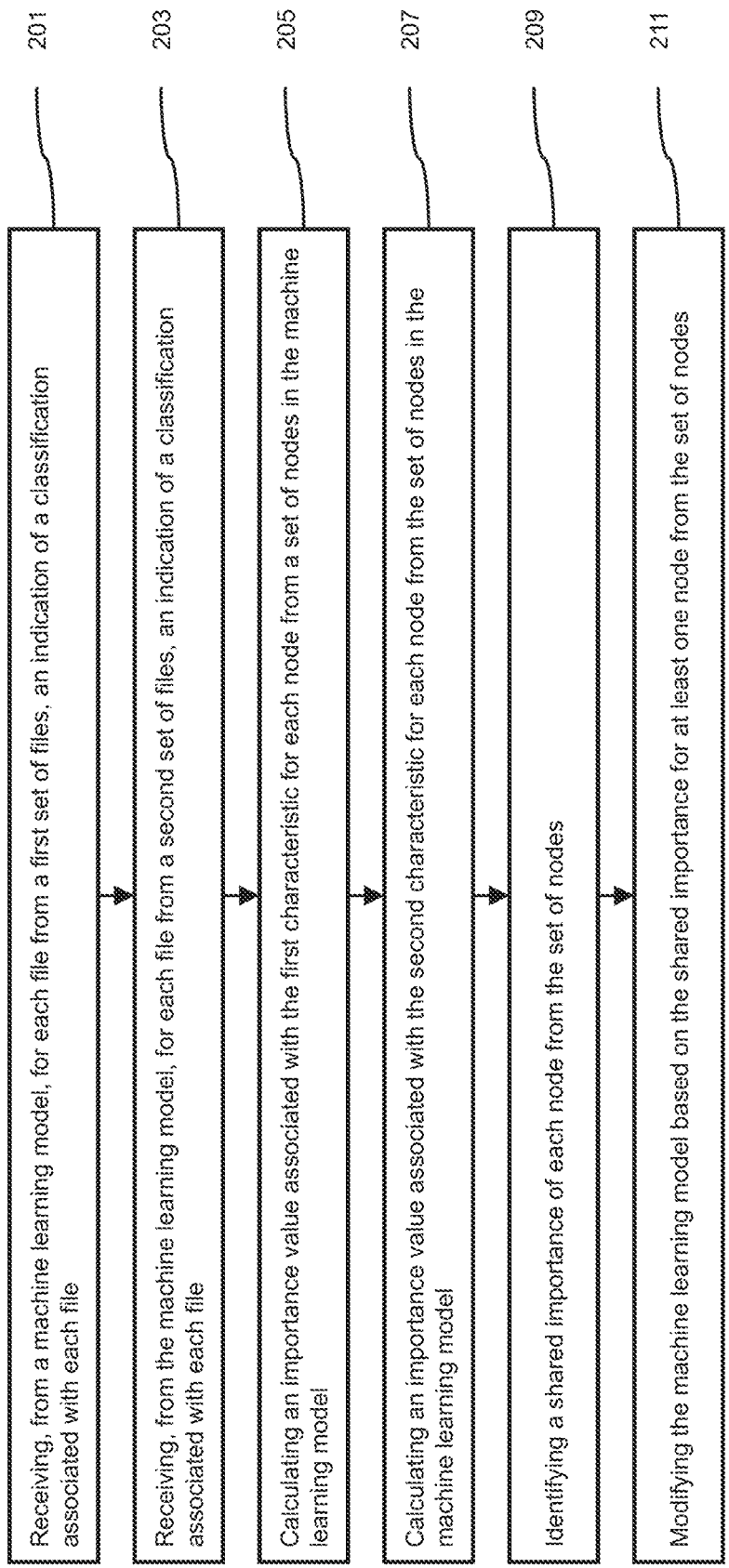
FIG. 2 is a flowchart illustrating a method for modifying a machine learning model based on a shared importance of multiple nodes within the machine learning model, according to an embodiment.

FIG. 2 is a flowchart illustrating a method for modifying a machine learning model based on a shared importance of each node from a set of nodes in the machine learning model, according to an embodiment. At 201, a processor (e.g., similar to the processor 110 shown and described with respect to FIG. 1) receives, from a machine learning model (e.g., similar to the neural network model 113 shown and described with respect to FIG. 1), an indication of a classification associated with each file (e.g., similar to the first file 125 shown and described with respect to FIG. 1) from a first set of files (e.g., similar to the first set of files 124 shown and described with respect to FIG. 1). Each file in the first set of files has a first characteristic.

At 203, the processor receives, from a machine learning model, an indication of a classification associated with each file (e.g., similar to the second file 127 shown and described with respect to FIG. 1) from a second set of files (e.g., similar to the second set of files 126 shown and described with respect to FIG. 1). Each file in the second set of files has a second characteristic. In some instances, the second characteristic can be different from the first characteristic.

At 205, the processor calculates an importance value associated with the first characteristic for one or more nodes from a set of nodes in the machine learning model. The importance value for a node can be an indication of the importance of that node in the classification by the machine learning model of files having the first characteristic. In some instances, the importance value can be calculated using Fisher information as described herein. At 207, the processor calculates an importance value associated with the second characteristic for one or more nodes from the set of nodes in the machine learning model.

At 209, the processor identifies a shared importance of one or more nodes from a set of nodes in the machine learning model. The shared importance of a node can be identified based on the importance value associated with the first characteristic during the classification of the first set of files and the importance value associated with the second characteristic during the classification of the second set of files. In some instances, the shared importance can be identified, for example, using a Fisher information plot as described in further detail herein.

At 211, the processor modifies the machine learning model based on the shared importance for at least one node from the set of nodes. In some instances, the modification can involve removing one or more nodes from the machine learning model based on the shared importance for that node meeting a predefined criterion (e.g., a value associated with the shared importance is less than a predetermined threshold). In such instances, removal of the node may not impact and/or may have little impact on the effectiveness of the machine learning model.

In some instances, the modification can involve improving the performance of the machine learning model associated with the classification of the first set of files and classification of the second set of files. A modification can reduce the size, the number of layers in the neural network and/or the complexity of a neural network without much (if any) performance loss. In some instances, a modification can include adding a set of nodes to the existing set of nodes based on the shared importance. For example, a neural network model can add a set of new nodes to increase an existing capacity to classify files belonging to a specific set of files. In some instances, the set of new nodes can be added based on the existing nodes of the neural network having high shared importance values and thus indicating that additional capacity may potentially increase the effectiveness of the neural network.

In other instances, the modification can include splitting an existing neural network model to classify files from the first set of files and/or files from the second set of files. For example, if the shared importance values of the nodes of the neural network are low, the neural network can be split into two neural networks, one to classify the first set of files and one to classify the second set of files. Similarly stated, if the nodes are not used to perform both tasks (e.g., classification of the first set of files and classification of the second set of files), the neural network model can be split to define two more efficient neural networks (e.g., one to classify the first set of files and one to classify the second set of files). In yet another instance, the modification can include modifying the neural network and/or defining a new neural network based on the original neural network to allow for classification of characteristics not classified by the original neural network (e.g., characteristics that are present in the sets of files but for which a classification is not made by the original neural network), as described in further detail herein.

As an example, the processor can receive a '.doc' file from a first set of '.doc' files to be classified. The processor can implement a feature extractor to obtain a feature vector as described herein. The output of the feature extractor is then provided to a machine learning model. A machine learning model, using the feature vector, can produce a classification (e.g., malicious or benign) associated with the '.doc' file. Similarly, the processor can receive a '.docx' file from a second set of '.docx' files to be classified. The processor can implement a feature extractor to obtain a feature vector as described herein. The output of the feature extractor is then provided to a machine learning model. A machine learning model, using the feature vector, can produce a classification (e.g., malicious or benign) associated with the '.docx' file. The processor then calculates Fisher information for one or more nodes in the machine learning model for classifying both '.doc' files and '.docx' files using a Fisher information generator (e.g., similar to the Fisher information generator 115 shown and described with respect to FIG. 1). The Fisher information can be used to calculate the importance value of the nodes in the machine learning model for classifying both '.doc' files and '.docx' files. The processor stores the Fisher information and the importance values in the memory.

The processor then identifies a shared importance of one or more nodes from a set of nodes in the machine learning model. The shared importance can include nodes of high importance (during classification) to both '.doc' files and '.docx' files. Furthermore, in some instances, the shared importance can be identified using a Fisher information plot as described herein. Based on the shared importance, the processor can modify at least one node from the set of nodes in the machine learning model.

The modified model may then be used as or in a classifier. The classifier may be used in any suitable context or purpose, including, for example, the classification of information, files, content, events, or behavior in the context of security threat assessment. For example, classifications may be used to assess the risk presented by information, files, content, events, or behavior. The modified model may be further modified, for example, with additional training data, or by combination with other models, which also may be modified as well.

Figure 3:
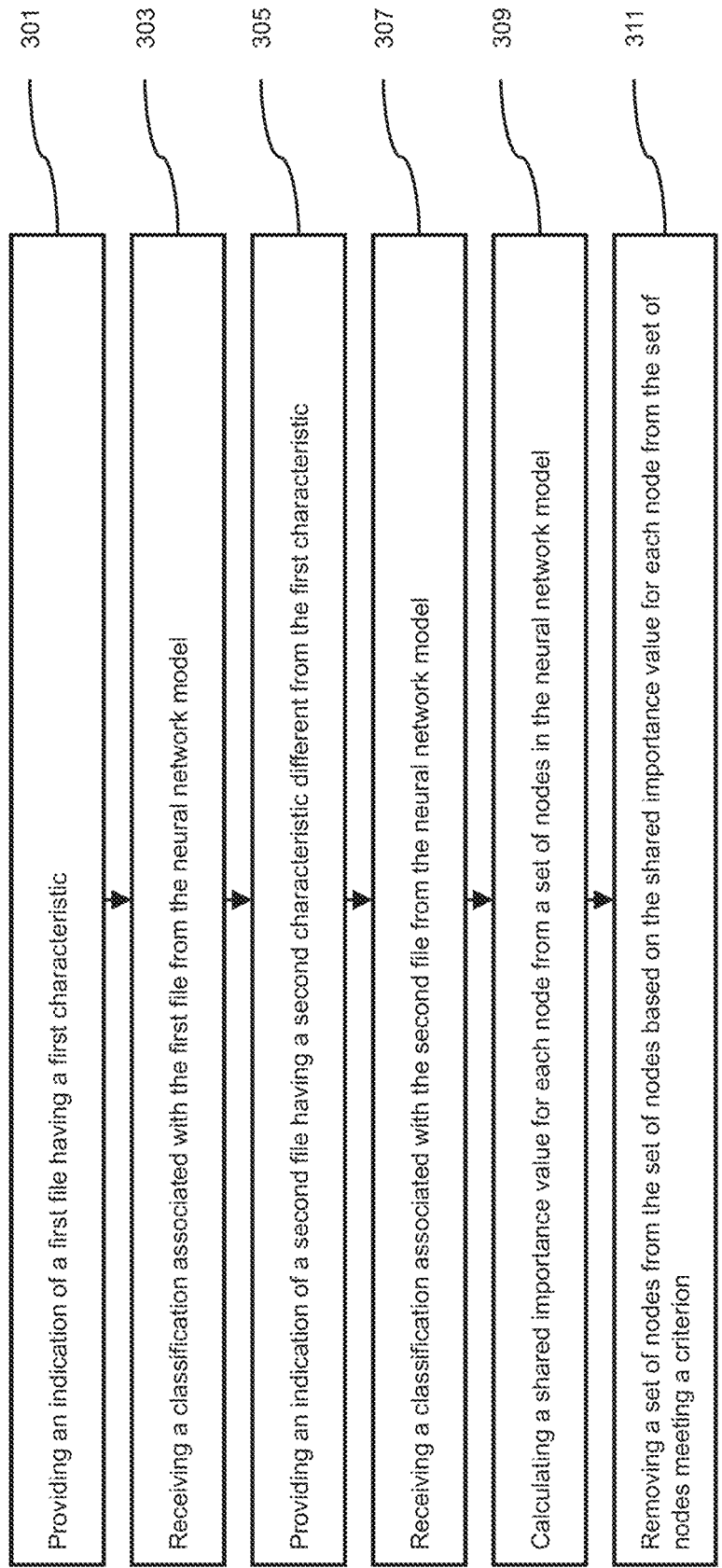
FIG. 3 is a flowchart illustrating a method for removing at least one node from a machine learning model based on a shared importance of multiple nodes within the machine learning model, according to an embodiment.

FIG. 3 is a flowchart illustrating a method for removing at least one node from a machine learning model based on a shared importance of multiple nodes within the machine learning model, according to an embodiment. The processor (e.g., similar to the processor 110 shown and described with respect to FIG. 1) can receive a first file (e.g., similar to the first file 125 shown and described with respect to FIG. 1) from a first set of files (e.g., similar to the first set of files 124 shown and described with respect to FIG. 1) having a first characteristic. The processor then uses a feature extractor (e.g., similar to the feature extractor 111 shown and described with respect to FIG. 1) to extract the features of the first file. Based on the features of the first file, the processor can classify the first file using a neural network.

At 301, the processor provides an indication of the first file (e.g., the features extracted from the first file) to a neural network model (e.g., similar to the neural network model 113 shown and described with respect to FIG. 1). At 303, the processor receives a classification associated with the first file from the neural network model. The processor can store the received classification associated with the first file in a memory.

The processor can further receive a second file (e.g., similar to the second file 127 shown and described with respect to FIG. 1) from a second set of files (e.g., similar to the second set of files 126 shown and described with respect to FIG. 1) having a second characteristic. The processor then uses a feature extractor (e.g., similar to the feature extractor 111 shown and described with respect to FIG. 1) to extract the features of the second file. Based on the features of the second file, the processor can classify the second file using the neural network.

At 305, the processor provides an indication of a second file (e.g., the features extracted from the second file) to the neural network model. At 307, the processor receives a classification associated with the second file from the neural network model. The processor can further store the received classification associated with the second file in a memory.

At 309, the processor calculates a shared importance value for one or more nodes from a set of nodes in the neural network model. The shared importance value for a node indicates an amount to which that node is used to produce both the classification associated with the first file and the classification associated with the second file.

At 311, based on the shared importance value of one or more nodes in the set of nodes, the processor removes one or more nodes from the set of nodes. In some instances, the processor can remove one or more nodes having a shared importance value meeting a criterion (e.g., having a shared importance value that is less than a threshold).

In other instances, the processor can be configured to modify the neural network by adding a set of nodes to the existing set of nodes of the neural network based on the shared importance for the at least one node meeting a criterion. The modification can include adding a set of nodes to the existing set of nodes based on the shared importance. For example, a neural network model can add a set of new nodes to increase an existing capacity to classify files belonging to a specific set of files. In some instances, the set of new nodes can be added based on the existing nodes of the neural network having high shared importance values and thus indicating that additional capacity may potentially increase the effectiveness of the neural network.

For example, a shared information detection device can be configured to classify images. A first set of images can include images of animals including images of dogs and images of cats. A second set of images can include images of vehicles including images of cars and images of trucks. A neural network model included in a shared information detection device can be configured to classify images as belonging to animals or vehicles. A processor (e.g., included in a shared information detection device such as shared information detection device 100 of FIG. 1) can determine the importance of each node in the neural network model for classifying images as including animals or vehicles. In particular, the processor can determine a shared importance of the nodes for the classification of images of animals and images of vehicles as including an animal or a vehicle. Based on the shared importance, a shared information detection device can be configured to modify a neural network by adding and/or removing one or more nodes from the neural network.

Furthermore, a shared information detection device can be configured to modify the neural network model and/or define a new neural network model based on the original neural network to allow for classification of characteristics not classified by the original neural network model (e.g., characteristics that are present in the sets of files but for which a classification is not made by the original neural network model). Specifically, based on the Fisher information and/or the shared importance of the nodes of the original neural network model to making the original classification, nodes from the original neural network model can be used to define a new neural network model that makes a second classification of the files.

For example, a shared information detection device can define a neural network model to classify images as dogs or cats based on the neural network used to classify images as animals or vehicles. Specifically, the shared information detection device can identify a shared importance of the nodes in the neural network model in classifying as animals (rather than vehicles) both the images of dogs and the images of cats. Specifically, a Fisher information generator (e.g., Fisher information generator 115 of FIG. 1) can identify which nodes are important to classify dogs as animals and which nodes are important to classify cats as animals (e.g., based on Fisher information computed for the set of images having dogs and Fisher information computed for the set of images having cats, respectively). A shared information generator (e.g., shared information generator 117 of FIG. 1) can then identify a shared importance for each node in the classification of both dogs and cats as animals. Using this information, the shared information detection device can identify nodes that may be used to differentiate cats from dogs. Specifically, nodes that do not have a shared importance value, but still have a high importance value for one of dogs or cats, can be used to differentiate between the two. Using these nodes, the neural network model can be modified and/or a new neural network model can be defined to classify dogs and cats (rather than animals and vehicles). Thus, using the shared importance values of the nodes in a first neural network model that produces a first classification, a second neural network model that produces a second classification (different from the first classification) can be defined.

FIGS. 4a, 4b and 4c are schematic illustrations of a neural network model (e.g., similar to the neural network model 113 shown and described with respect to FIG. 1), according to an embodiment. In FIGS. 4a, 4b and 4c, the neural network model includes an input layer 410, a hidden layer-1 420, a hidden layer-2 430 and an output layer 440. The input layer 410 includes input nodes that are used for receiving features associated with one or more input files (e.g., images, documents and/or the like). The hidden layer-1 420 and the hidden layer-2 430 are used for classification of one or more input files. The hidden layer-1 420 and the hidden layer-2 430 include a set of interconnected nodes.

For classification, the indications of the features of a file can be input to the nodes of the input layer. The hidden layer-1 420 and the hidden layer-2 430 can then classify the file using the features and the classification of the file can be obtained from the output nodes of the output layer 440.

In a given neural network, specific nodes can be important for producing a classification associated with an input file, while other nodes may not be as important. As described herein, the important nodes can be determined using Fisher information. FIG. 4a, illustrates important nodes (shown in solid color in FIG. 4a) for classifying a first file (e.g., similar to the first file 125 shown and described with respect to FIG. 1). The solid colored nodes in FIG. 4a are important for classifying the first file from a first set of files. Similarly, FIG. 4b, illustrates important nodes (shown in solid color in FIG. 4b) for classifying a second file (e.g., similar to the second file 127 shown and described with respect to FIG. 1). The solid colored nodes in FIG. 4b are important for classifying the second file from a second set of files. The second characteristic is different from the first characteristic.

FIG. 4c illustrates the neural network with important nodes for classification associated with the first file based on a first characteristic and for classification associated with the second file based on a second characteristic shown in solid color. A node 422 is not included as an important node because the node 422 is not important in the classification associated with the first file or in the classification associated with the second file. In some instances, the node 422 can be removed (or excluded) to reduce the size and/or the complexity of the neural network without much (if any) performance loss. Removal of the node 422 can also improve the computation time for the classification of first file and second file (e.g., by reducing the complexity of the neural network). In other instances, the neural network can be configured to add one or more nodes to the existing set of nodes (as described in further detail herein).

Figure 5A:
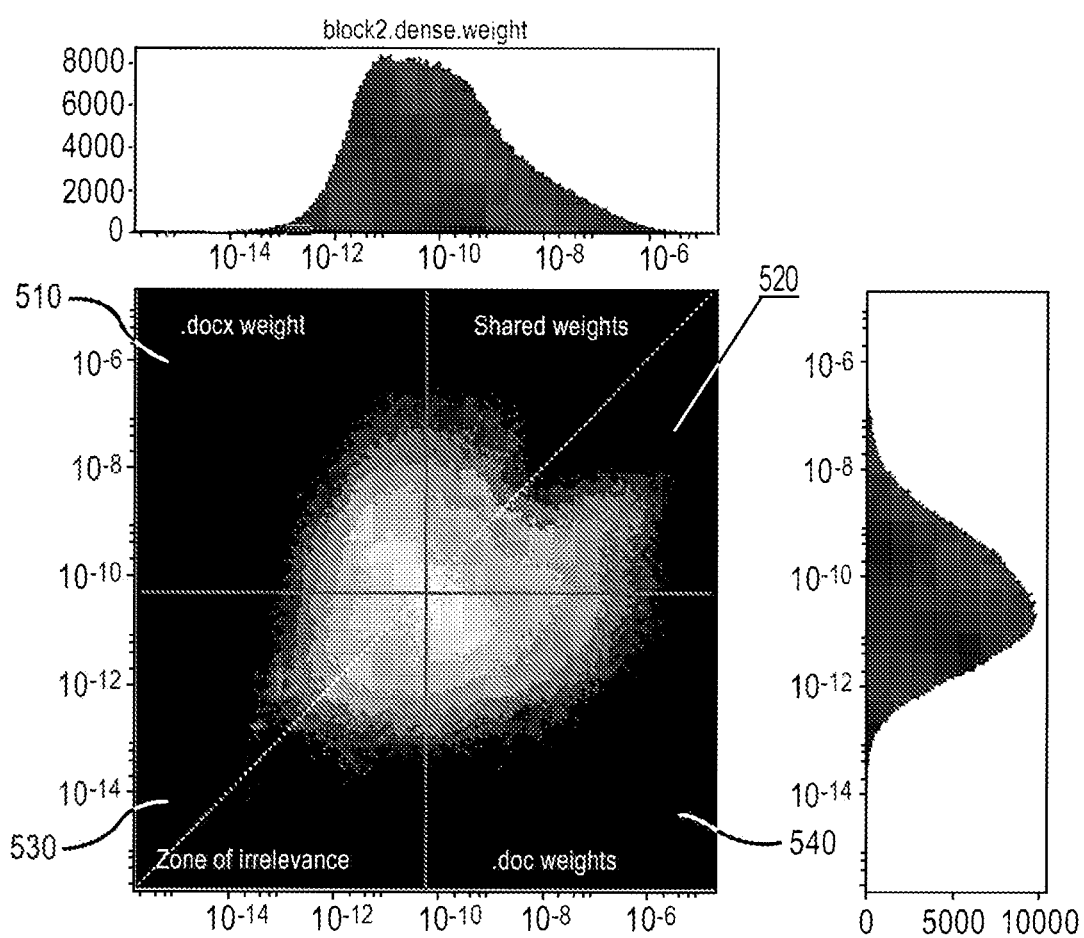
FIG. 5a is a graphical illustration of a Fisher information plot, according to an embodiment.

FIG. 5a is a graphical illustration of a Fisher information plot, according to an embodiment. The X-axis (shown in FIG. 5a) represents Fisher information associated with the importance value of weights belonging to nodes in a neural network for a set of files including '.doc' files. The importance value of the weights increases from left to right. The X-axis label is referred to as '.doc' weights. The Y-axis (shown in FIG. 5a) represents Fisher information associated with the importance value of weights belonging to the nodes in the neural network for another set of files including '.docx' files. The importance value of the weights increases from bottom to top. The Y-axis label is referred to as '.docx' weights. Both the X-axis and the Y-axis represent the importance values of nodes in a neural network for classifying the '.doc' files and the '.docx' files, respectively. A node with a higher importance value for the classification of '.doc' files will lie towards the right of the X-axis while a node with lower importance value for the classification of '.doc' files will lie towards the left of the X-axis. A node with higher importance value for the classification of '.docx' files will lie towards the top of the Y-axis while a node with lower importance value for the classification of the '.docx' files will lie towards the bottom of the Y-axis. Thus, a node with higher importance value for the classification of both '.doc' files and '.docx' files will lie towards the right of the X-axis and towards the top of the Y-axis (e.g., in the upper right quadrant).

In some instances, the graph (shown in FIG. 5a) can be divided into four zones, namely: Zone of high importance for '.docx' files 510, Zone of Shared weights 520, Zone of irrelevance 530 and Zone of high importance for '.doc' files 540. In some implementations, such zones can be based on thresholds (e.g., set by a user) that may be used to delineate different zones (e.g., and can associate different actions with such zones). In other instances, any number of zones may be defined (e.g., two, five, six, etc.). In yet other implementations, zones are not specifically defined and the points shown in FIG. 5a are on a sliding scale, but not associated with a specific category. As such, in such implementations the zones depicted in FIG. 5a are merely used for illustration and understanding of the scale. For example, a node with the coordinates ($10^{-6}$, $10^{-6}$) can be more important than a node with the coordinates ($10^{-8}$, $10^{-8}$), even though both are shown in FIG. 5a as being in the Zone of Shared weights 520. As another example, the node with coordinates ($10^{-11}$, $10^{-11}$) may not be significantly less important than the node with coordinates ($10^{-10}$, $10^{-10}$), even though they are shown in FIG. 5a as in different zones.

The zone of high importance for '.docx' files 510 represents Fisher information associated with the nodes of a neural network that are important for the classification of '.docx' files but not for .doc files. Coordinates in this zone have Y-axis values greater than X-axis values. The zone of Shared weights 520 represents Fisher information associated with the nodes that are important for the classification of both '.docx' files and '.doc' files. Coordinates in this zone have relatively high X values and relatively high Y values. The zone of irrelevance 530 represents Fisher information associated with the nodes that are less important to the classification of both '.doc' files and '.docx' files. Coordinates in this zone have relatively low X values and relatively low Y values. The zone of high importance for '.doc' files 540 represents Fisher information associated with the nodes that are important for the classification of '.doc' files but not ".docx" files. Coordinates in this zone have X-axis values greater than Y-axis values.

Figure 5B:
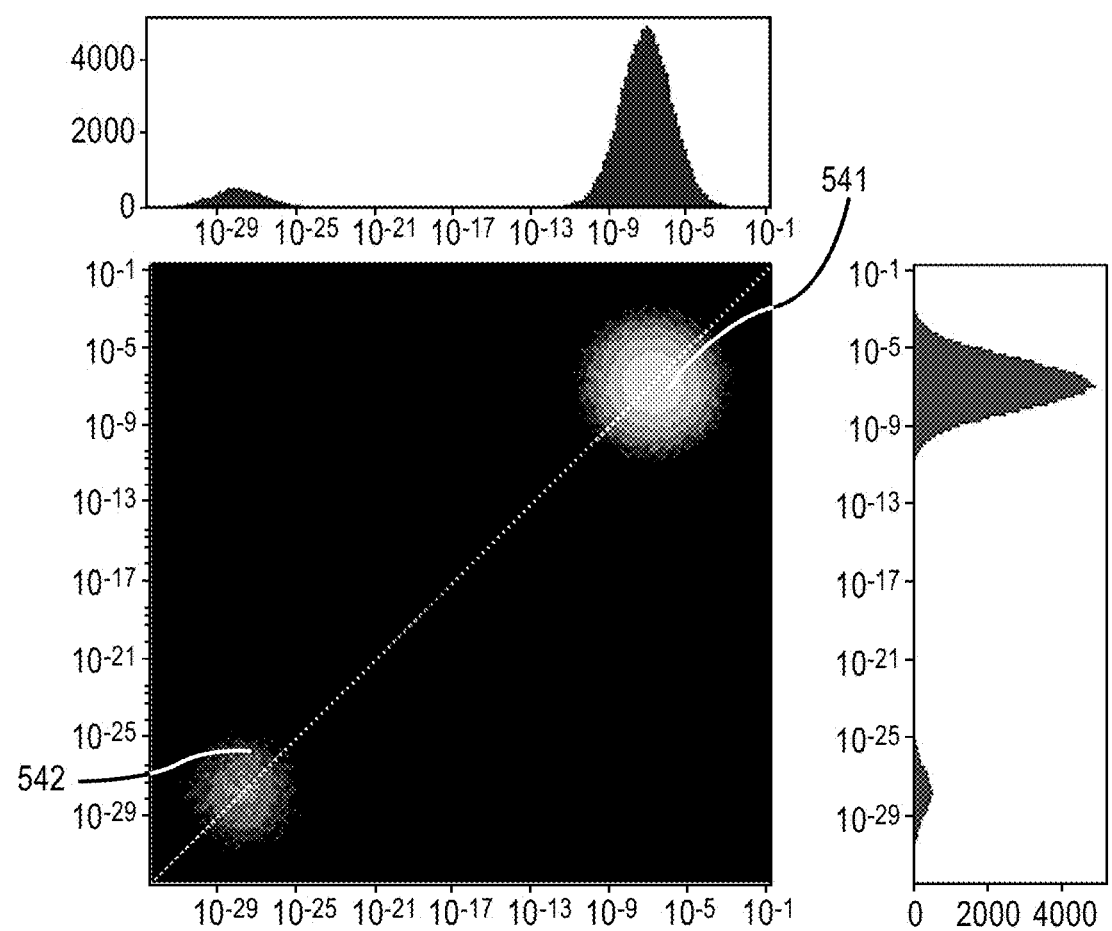
FIG. 5b is a graphical illustration of a Fisher information plot indicating two clusters of weights, according to an embodiment.

FIG. 5b illustrates a Fisher information plot representing shared weights and irrelevant weights. The Fisher information plot illustrates one cluster 541 in the zone of shared weights and/or nodes and another cluster 542 in the zone of irrelevance. The cluster 541 in the zone of shared weights is important to both tasks and/or classifying both sets of documents while the cluster 542 in the zone of irrelevance may not be important to either task or classifying either set of documents. Accordingly, in some instances, the nodes represented by cluster 542 can be removed from the neural network without much (if any) performance loss.

Figure 5C:
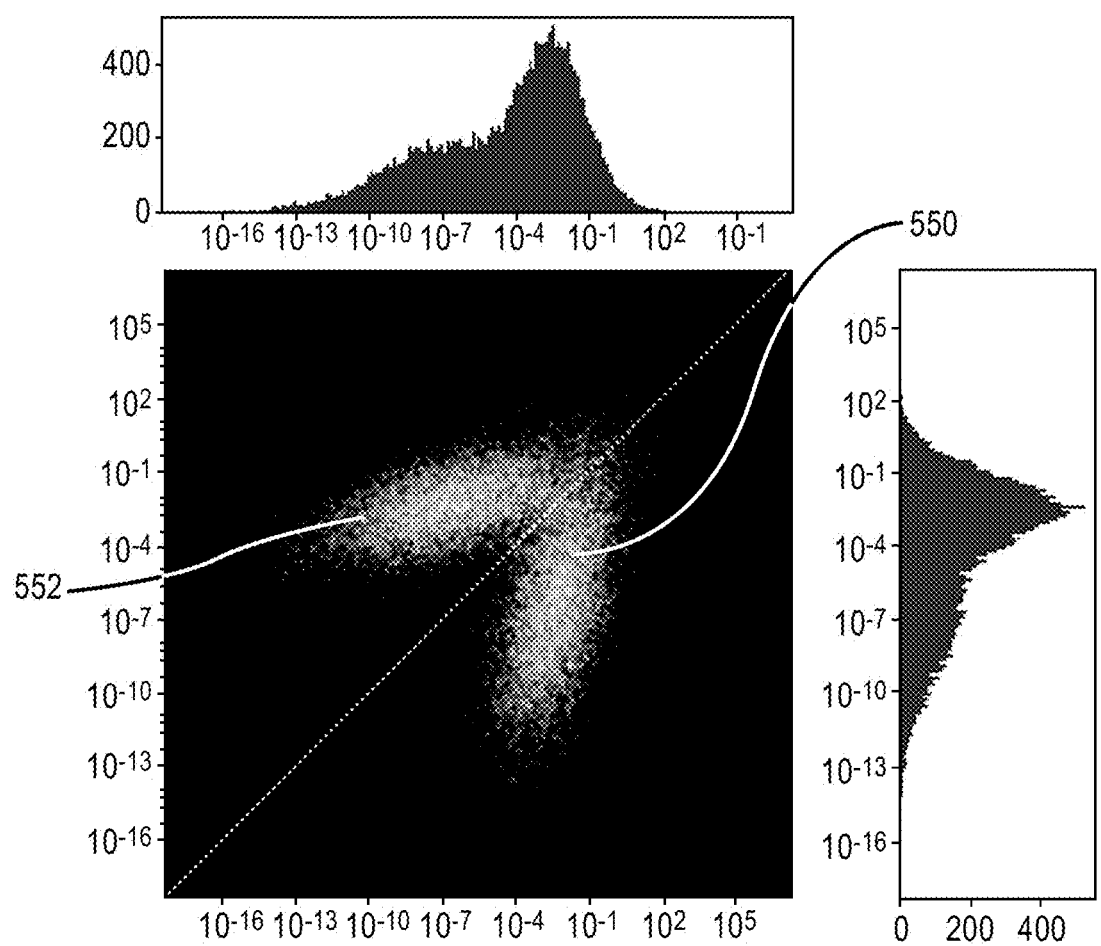
FIG. 5c is a graphical illustration of a Fisher information plot indicating high weight sharing, according to an embodiment.

FIG. 5c illustrates a Fisher information plot representing high weight sharing. The Fisher information plot illustrates two clusters, cluster 550 and cluster 552 separated by a diagonal. Both the clusters 550 and 552 represent a high number of weights in common between two tasks (such as classifying two different sets of documents having different characteristics).

Figure 5D:
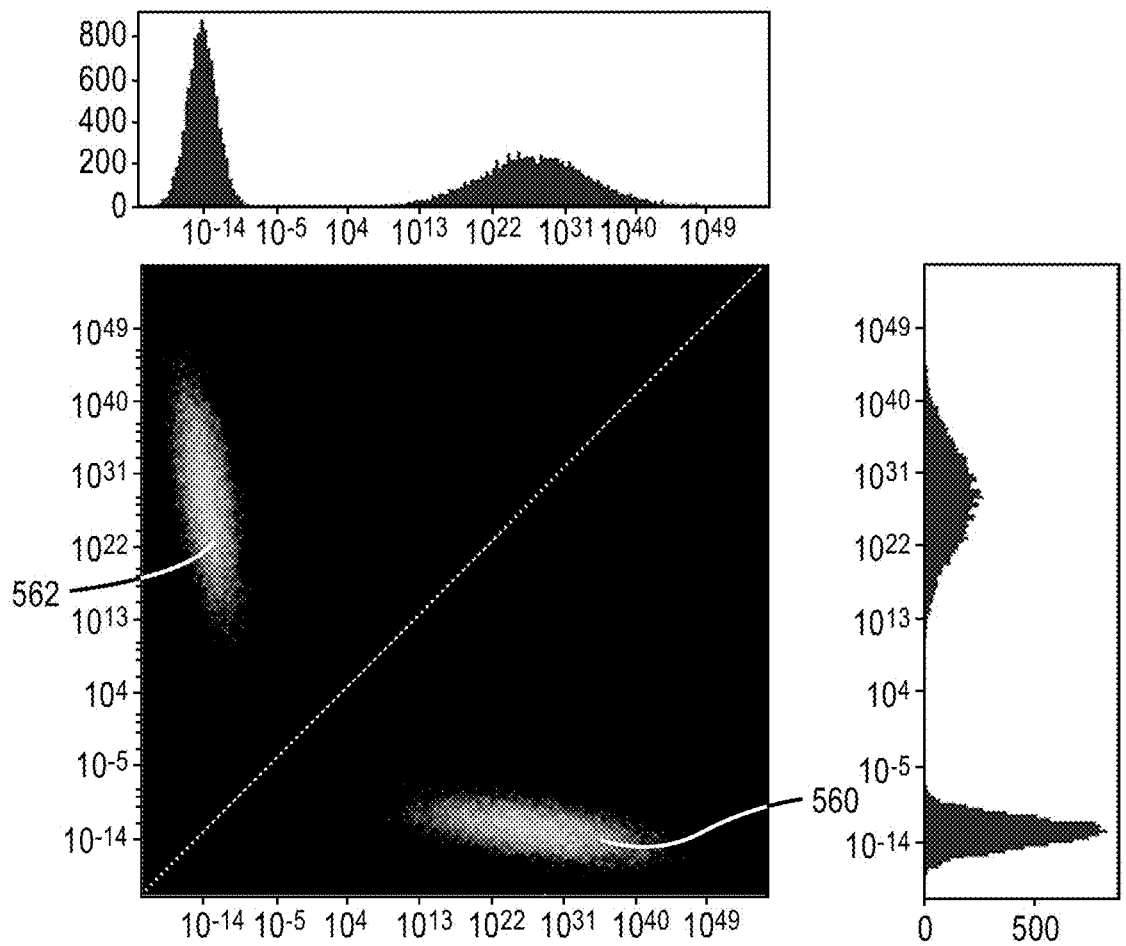
FIG. 5d is a graphical illustration of a Fisher information plot indicating low weight sharing, according to an embodiment.

FIG. 5d illustrates a Fisher information plot representing nearly independent weights. The Fisher information plot represents two clusters, cluster 560 and cluster 562. Cluster 560 is of high importance for a task represented by the X-axis and cluster 562 is of high importance for a another task represented by the Y-axis. There is no common importance between the two tasks and thus both clusters 560 and 562 are mutually exclusive. Thus, the nodes used to perform a first task (such as classifying a first set of documents having a first characteristic) are substantially independent from the nodes used to perform a second task (such as classifying a second set of documents having a second characteristic) and the neural network is effectively operating as two separate neural networks. In some instances, the neural network can be split into two separate less complex neural networks since there does not appear to be a benefit or efficiency to having a more complex single neural network that performs both tasks.

While shown and described above as classifying a set of files using a neural network model, in other instances, any suitable type of machine learning model can be used such as, for example, a deep neural network, a multi-task feed forward network, a gradient boosted tree, a linear and/or logistic regression model, other differentiable machine learning models and/or the like.

While shown and described above as using Fisher information to identify an importance of a node in a neural network to a classification of a file or set of files, in other instances any other suitable metric can be used to determine an importance of a node in a neural network. For example, in some instances a mean absolute deviation of a gradient, a measure of a sensitivity of a weight of a node, and/or any other suitable characteristic and/or measurement can be used.

While shown and described above as processing and/or classifying files, in other instances a shared information detection device can be used to process and/or classify an artifact. An artifact can be or include, for example, any portable executable file(s), registry key(s), dataset(s), file-path(s), Uniform Resource Locator (URL), device(s), device behavior, user behavior, network behavior, network identifier, and/or entity represented and/or associated with computer-related resources. For further examples, an artifact can include a function of software code, a webpage(s), a data file(s), a model file(s), a source file(s), a. script(s), a process, a binary executable file(s), a table(s) in a database system, a development deliverable(s), an active content(s), a word-processing document(s), an e-mail message(s), a text message, a network address, a device or entity (e.g., a network-connected compute device and/or computer system, a server, a smartphone, a tablet a laptop, a multimedia. device. etc.), a network address (e.g., a Media Control (MAC) address, Internet Protocol UP) address, etc.) of a compute device, and/or the like.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:

a memory; and a processor operatively coupled to the memory, the processor configured to provide an indication of each file from a first set of files to a neural network model, each file from the first set of files having a first characteristic, the processor configured to receive, from the neural network model, an indication of a classification associated with each file from the first set of files, the processor configured to provide an indication of each file from a second set of files to the neural network model, each file from the second set of files having a second characteristic, the processor configured to receive, from the neural network model, an indication of a classification associated with each file from the second set of files, the processor configured to calculate Fisher information associated with the first characteristic for each node from a plurality of nodes in the neural network model, the processor configured to calculate Fisher information associated with the second characteristic for each node from the plurality of nodes in the neural network model, the processor configured to identify a shared importance of each node from the plurality of nodes to the classification associated with the first set of files and the classification associated with the second set of files based on the Fisher information associated with the first characteristic and the Fisher information associated with the second characteristic, the processor configured to modify the neural network model by adding a set of nodes to the plurality of nodes based on the shared importance for at least one node from the plurality of nodes meeting a criterion.

2. The apparatus of claim 1, wherein the criterion is a first criterion, the processor is configured to modify the neural network model by removing the at least one node from the neural network model based on the shared importance for the at least one node meeting a second criterion.

3. The apparatus of claim 1, wherein the criterion is a first criterion and the neural network model is a first neural network model, the processor is configured to modify the first neural network model by splitting the first neural network model into a second neural network model associated with the first characteristic and a third neural network model associated with the second characteristic based on the shared importance for the at least one node meeting a second criterion.

4. The apparatus of claim 1, wherein the processor is configured to identify a shared importance of each node from the plurality of nodes to (1) a classification associated with each file from a first subset of files having a third characteristic and from the first set of files and (2) a classification associated with each file from a second subset of files having a fourth characteristic and from the first set of files.

5. The apparatus of claim 1, wherein the first characteristic is a first file format and the second characteristic is a second file format different from the first file format.

6. The apparatus of claim 1, wherein the classification associated with each file from the first set of files is an indication of whether that file is malicious.

7. A non-transitory processor-readable medium storing code representing instructions to be executed by a processor, the code comprising code to cause the processor to:
receive, from a machine learning model, an indication of a classification associated with each file from a first set of files, each file from the first set of files having a first characteristic;
receive, from the machine learning model, an indication of a classification associated with each file from a second set of files, each file from the second set of files having a second characteristic different from the first characteristic;
calculate an importance value associated with the first characteristic for each node from a plurality of nodes in the machine learning model;
calculate an importance value associated with the second characteristic for each node from the plurality of nodes in the machine learning model;
identify a shared importance of each node from the plurality of nodes to the classification associated with the first set of files and the classification associated with the second set of files based on the importance value associated with the first characteristic and the importance value associated with the second characteristic; and
modify the machine learning model by adding a set of nodes to the plurality of nodes based on the shared importance for at least one node from the plurality of nodes meeting a criterion.

8. The non-transitory processor-readable medium of claim 7, wherein the machine learning model is a neural network model.

9. The non-transitory processor-readable medium of claim 7, wherein the criterion is a first criterion, the code to cause the processor to modify includes code to cause the processor to modify the machine learning model by removing the at least one node from the machine learning model based on the shared importance for the at least one node meeting a second criterion.

10. The non-transitory processor-readable medium of claim 7, wherein the criterion is a first criterion and the machine learning model is a first machine learning model, the code to cause the processor to modify includes code to cause the processor to split the first machine learning model into a second machine learning model associated with the first characteristic and a third machine learning model associated with the second characteristic based on the shared importance for the at least one node meeting a second criterion.

11. The non-transitory processor-readable medium of claim 7, further comprising code to cause the processor to:
identify a shared importance of each node from the plurality of nodes to (1) a classification associated with each file from a first subset of files having a third characteristic and from the first set of files and (2) a classification associated with each file from a second subset of files having a fourth characteristic and from the first set of files.

12. The non-transitory processor-readable medium of claim 7, wherein the first characteristic is a first file format and the second characteristic is a second file format different from the first file format.

13. The non-transitory processor-readable medium of claim 7, wherein the classification associated with each file from the first set of files is an indication of whether that file is malicious.

14. The non-transitory processor-readable medium of claim 7, wherein the importance value associated with the first characteristic for each node from the plurality of nodes is Fisher information associated with that node.

15. A method, comprising:
providing an indication of a first file to a neural network model, the first file having a first characteristic;
receiving a classification associated with the first file from the neural network model;
providing an indication of a second file to the neural network model, the second file having a second characteristic different from the first characteristic;
receiving a classification associated with the second file from the neural network model;
calculating a shared importance value for each node from a plurality of nodes in the neural network model, the shared importance value for each node from the plurality of nodes indicating an amount to which that node is used to produce both the classification associated with the first file and the classification associated with the second file; and
modifying the neural network model by adding a set of nodes to the plurality of nodes based on the shared importance value for each node from the set of nodes meeting a criterion.

16. The method of claim 15, further comprising:
calculating an importance value associated with the first characteristic for each node from the plurality of nodes, the importance value associated with the first characteristic for each node from the plurality of nodes indicating an amount to which that node is used to produce the classification associated with the first file; and
calculating an importance value associated with the second characteristic for each node from the plurality of nodes, the importance value associated with the second characteristic for each node from the plurality of nodes indicating an amount to which that node is used to produce the classification associated with the second file, the calculating the shared importance value includes calculating the shared importance value for each node from the plurality of nodes based on the importance value associated with the first characteristic for that node and the importance value associated with the second characteristic for that node.

17. The method of claim 15, wherein the shared importance value is based on Fisher information associated with the plurality of nodes in the neural network model.

18. The method of claim 15, wherein the first characteristic is a first file format and the second characteristic is a second file format different from the first file format.

19. The method of claim 15, wherein the classification associated with the first file is an indication of whether the first file is malicious.

20. An apparatus, comprising:
a memory; and
a processor operatively coupled to the memory, the processor configured to provide an indication of each file from a first set of files to a first neural network model, each file from the first set of files having a first characteristic, the processor configured to receive, from the first neural network model, an indication of a classification associated with each file from the first set of files,
the processor configured to provide an indication of each file from a second set of files to the first neural network model, each file from the second set of files having a second characteristic, the processor configured to receive, from the first neural network model, an indication of a classification associated with each file from the second set of files,
the processor configured to calculate Fisher information associated with the first characteristic for each node from a plurality of nodes in the first neural network model, the processor configured to calculate Fisher information associated with the second characteristic for each node from the plurality of nodes in the first neural network model,
the processor configured to identify a shared importance of each node from the plurality of nodes to the classification associated with the first set of files and the classification associated with the second set of files based on the Fisher information associated with the first characteristic and the Fisher information associated with the second characteristic,
the processor configured to modify the first neural network model by splitting the first neural network model into a second neural network model associated with the first characteristic and a third neural network model associated with the second characteristic based on the shared importance for at least one node from the plurality of nodes meeting a criterion.

21. The apparatus of claim 20, wherein the processor is configured to identify a shared importance of each node from the plurality of nodes to (1) a classification associated with each file from a first subset of files having a third characteristic and from the first set of files and (2) a classification associated with each file from a second subset of files having a fourth characteristic and from the first set of files.

22. The apparatus of claim 20, wherein the first characteristic is a first file format and the second characteristic is a second file format different form the first file format.

23. The apparatus of claim 20, wherein the classification associated with each file from the first set of files is an indication of whether that file is malicious.

24. A method, comprising:
providing an indication of a first file to a first neural network model, the first file having a first characteristic;
receiving a classification associated with the first file from the first neural network model;
providing an indication of a second file to the first neural network model, the second file having a second characteristic different from the first characteristic;
receiving a classification associated with the second file from the first neural network model;
calculating a shared importance value for each node from a plurality of nodes in the neural network model, the shared importance value for each node from the plurality of nodes indicating an amount to which that node is used to produce both the classification associated with the first file and the classification associated with the second file; and
modifying the first neural network model by splitting the first neural network model into a second neural network model associated with the first characteristic and a third neural network model associated with the second characteristic based on the shared importance value for each node from the plurality of nodes meeting a criterion.

25. The method of claim 24, wherein the shared importance value is based on Fisher information associated with the plurality of nodes in the neural network model.

26. The method of claim 24, wherein the first characteristic is a first file format and the second characteristic is a second file format different from the first file format.

27. The method of claim 24, wherein the classification associated with the first file is an indication of whether the first file is malicious.

* * * * *